(12) United States Patent
Hasunuma et al.

(10) Patent No.: US 8,590,566 B2
(45) Date of Patent: Nov. 26, 2013

(54) COUPLING DEVICE

(75) Inventors: Masahiro Hasunuma, Saitama (JP); Takashi Imai, Saitama (JP)

(73) Assignee: Surpass Industry Co., Ltd. (JP)

(*) Notice: Subject to any disclaimer, the term of this patent is extended or adjusted under 35 U.S.C. 154(b) by 0 days.

(21) Appl. No.: 13/208,320

(22) Filed: Aug. 11, 2011

(65) Prior Publication Data

US 2012/0037625 A1 Feb. 16, 2012

(30) Foreign Application Priority Data

Aug. 11, 2010 (JP) ................. 2010-180224

(51) Int. Cl.
*F16K 24/00* (2006.01)
*F16K 51/00* (2006.01)
*B65D 83/00* (2006.01)

(52) U.S. Cl.
USPC .......... 137/588; 251/144; 222/400.7

(58) Field of Classification Search
USPC ............ 251/144; 137/588, 614.05, 206, 212; 222/400.7, 400.8, 386.5, 464.1, 105, 222/95
See application file for complete search history.

(56) References Cited

U.S. PATENT DOCUMENTS

| | | | |
|---|---|---|---|
| 6,843,285 B2 * | 1/2005 | Ozawa | 141/326 |
| 7,819,381 B2 | 10/2010 | Abe | |
| 2003/0010387 A1 * | 1/2003 | Rauworth et al. | 137/588 |
| 2009/0020176 A1 * | 1/2009 | Hasegawa et al. | 137/614.05 |

FOREIGN PATENT DOCUMENTS

| | | |
|---|---|---|
| JP | 2001-192099 | 7/2001 |
| JP | 2002-114242 | 4/2002 |
| JP | 3464232 B2 | 11/2003 |
| JP | 2005-132465 | 5/2005 |
| JP | 3914560 | 5/2007 |
| WO | 2005119115 A1 | 12/2005 |
| WO | 2008035628 A1 | 3/2008 |

* cited by examiner

*Primary Examiner* — Eric Keasel
*Assistant Examiner* — Hailey K Do
(74) *Attorney, Agent, or Firm* — Schmeiser, Olsen & Watts

(57) ABSTRACT

A coupling device which is provided at a mouth 4a of a container accommodating a flexible container containing liquid and gas and which includes a plug 11 and a fitted member to be fitted in the plug 11, wherein the plug 11 includes a plug cylinder 11a, a liquid passage 16 communicating with the liquid and through which the liquid is let in and out, gas passages 17 communicating with the gas and through which the gas is let in and out, and fluid passages 19 communicating with a space between the container and the flexible container and through which fluid is let in and out.

5 Claims, 11 Drawing Sheets

COUPLING DEVICE

CROSS-REFERENCE TO RELATED APPLICATIONS

This application claims the benefit of Japanese Patent Application No. 2010-180224, the contents of which are incorporated herein by reference.

BACKGROUND OF THE INVENTION

1. Field of the Invention

The present invention relates to a coupling device, such as a liquid tank joint, for discharging liquid in a liquid tank.

2. Description of Related Art

Liquids, such as high-purity semiconductor chemicals and general chemicals, are generally stored in a liquid tank, such as a polyethylene tank, in a production plant and are shipped with a lid attached to a charging/discharging mouth formed on the liquid tank. A known example of a method for discharging liquid contained in such a liquid tank is a siphon system in which gas, such as air, is introduced into a container so that the liquid is discharged outside the container due to the gas pressure thereof.

In this siphon system, after a lid attached to the mouth of the liquid tank is removed, a siphon serving as a liquid passage and a plug provided with a gas passage therein are attached to the mouth. By connecting, to the plug, a socket to which a tube for discharging the liquid to the outside of the liquid tank and a tube for introducing gas can be connected, a liquid passage for discharging the liquid and a gas passage for introducing the gas are formed. Such a liquid tank joint is disclosed in, for example, Japanese Unexamined Patent Application, Publication No. 2001-192099 and the Publication of Japanese Patent No. 3464232.

While a container having an inner-liner bag for containing liquid, such as a chemical solution, is being conveyed, gas is sometimes given off by the liquid and accumulates above the liquid. When the liquid in the container is let out, with the socket connected to the plug so that the gas accumulates, the gas in the inner-liner bag is let out and is splashing out from the container together with the liquid. To prevent the liquid from splashing out from the container due to the gas in the inner-liner bag, a socket configured to let out the liquid after releasing the inner pressure of the gas in the inner-liner bag is disclosed in Japanese Unexamined Patent Application, Publication No. 2002-114242.

However, the inventions disclosed in Japanese Unexamined Patent Application, Publication No. 2001-192099 and the Publication of Japanese Patent No. 3464232 have a problem in that assembling of the plugs is complicated because the number of components for forming a liquid passage and a gas passage in the plugs is large.

Furthermore, the configuration described in Japanese Unexamined Patent Application, Publication No. 2002-114242 has a problem in that external pressure supplied between the inner-liner bag and the container acts on the inner-liner bag to cause the liquid to splash out from the container during use.

BRIEF SUMMARY OF THE INVENTION

The present invention is made in consideration of the circumstances described above, and an object thereof is to provide a coupling device that can easily be assembled and allows liquid in the container to be let out properly.

A coupling device of the present invention adopts the following solutions to solve the problems described above.

A coupling device according to an aspect of the present invention is a coupling device which is provided at the mouth of a container accommodating a flexible container containing liquid and gas and which includes a plug and a fitted member to be fitted in the plug, wherein the plug includes a cylindrical plug cylinder; a liquid passage communicating with the liquid and through which the liquid is let in and out; a gas passage communicating with the gas and through which the gas is let in and out; and a fluid passage communicating with a space between the container and the flexible container and through which fluid is let in and out, According to the above-described aspect of the present invention, because a plug equipped with a cylindrical plug cylinder, a gas passage, a fluid passage, and a liquid passage is used, this can decrease the number of components that constitute the liquid passage, the gas passages, and the fluid passage. Accordingly, this can simplify the assembly process of the coupling device and reduce the cost.

Since the plug having the liquid passage, the gas passages, and the fluid passages can be manufactured without sliding components, the occurrence of fine powder (particles) produced while the components slide can be prevented.

In the above-described aspect of the present invention, the plug is configured such that a plurality of the gas passages are provided on a circle centered on the axis of the plug cylinder in the axial direction, a plurality of the fluid passages are provided on a circle centered on the axis in the axial direction, and the gas passages and the fluid passages are provided at a predetermined angle with respect to each other.

This allows the gas passages and the fluid passages to be formed of a simple component, such as a cylindrical plug cylinder. This can therefore simplify the assembly process of the coupling device and reduce the cost.

Furthermore, in the coupling device according to the above-described aspect of the present invention, the fitted member may include fluid-passage unsealing means for releasing the seal of the fluid passages and liquid-passage sealing means for sealing the liquid passage. A sliding member may slide on the outer wall of the plug cylinder in the axial direction to release the seal of the opening, and after the seal of the fluid passages is released by the fluid-passage unsealing means, may release the seal of the liquid passage.

The above configuration can prevent the gas and liquid contained in the flexible container from being let out together from the container. This can therefore prevent the liquid from splashing out when let out from the container.

Furthermore, the coupling device according to the above-described aspect of the present invention may be configured such that the fitted member is a socket including a cylindrical socket cylinder that slides on the outer wall of the plug cylinder in the axial direction of the plug cylinder, opening sealing means provided at the socket cylinder and sealing the opening, the liquid-passage sealing means provided at the socket cylinder and sealing the liquid passage, and the fluid-passage unsealing means provided at the socket cylinder and releasing the seal of the fluid passages. The mouth of the container may include connecting means for connecting the plug and the socket to the mouth of the container; and the socket may be removed after the seal of the opening is released, and after the seal of the fluid passages is released by the fluid-passage unsealing means.

With the above configuration, the seal of the liquid passage is released after the pressure of fluid that acts on the flexible container is released, and the gas contained in the flexible container is released. Accordingly, this can prevent the gas and liquid from being let out together from the flexible container, thereby preventing the liquid from splashing when the socket is removed from the plug.

Furthermore, the coupling device according to the above-described aspect of the present invention may be configured such that the connecting means is cylindrical in shape, and the socket cylinder is inserted at the inner wall side of the connecting means; the socket cylinder has a recessed portion recessed in a predetermined shape in the outer wall thereof; and the connecting means has a protruding portion, in the radial direction of the inner wall thereof, that can be fitted in the recessed portion.

When the socket cylinder is to be inserted into the connecting means, the socket cannot be attached in the case where the shape of the protruding portion of the connecting means and the shape of the recessed portion of the socket cylinder differ. Thus, the above configuration can prevent an error in attaching the socket to the plug even if there are a plurality of kinds of socket.

Furthermore, the coupling device according to the above-described aspect of the present invention may be configured such that the fitted member is a lid having a cylindrical sealing cylinder that slides on the outer wall of the plug cylinder in the axial direction of the plug cylinder, opening sealing means provided at the sealing cylinder and sealing the opening, and liquid-passage sealing means provided at the sealing cylinder and sealing the liquid passage; the mouth of the container includes connecting means for connecting the plug and the lid to the mouth of the container; and the lid is movable relative to the connecting means so as to separate from the mouth of the container.

With the above configuration, the sealing cylinder can be slid in the axial direction of the plug cylinder by moving the lid relative to the connecting means so as to separate it from the mouth of the container. This allows the seal of the liquid passage to be released after the seal of the opening is released. This can therefore prevent the gas and liquid from being let out together from the flexible container, thereby preventing the liquid from splashing when let out from the flexible container.

DETAILED DESCRIPTION OF THE INVENTION

First Embodiment

A first embodiment of the present invention will be described hereinbelow using FIGS. 1 to 7.

Figure 1:
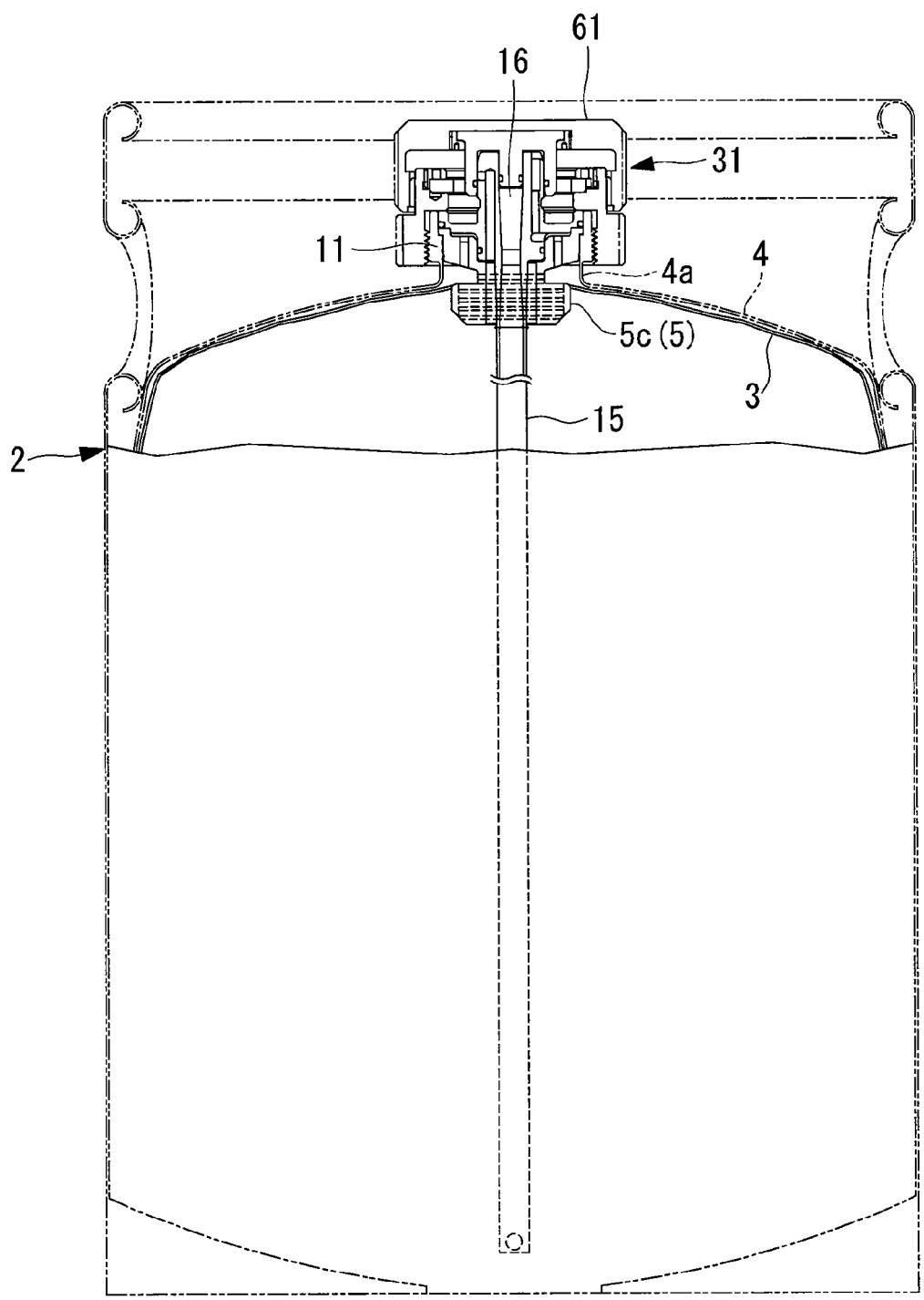
FIG. 1 is a schematic diagram showing the longitudinal-sectional configuration of a container equipped with a joint according to an embodiment of the present invention.
Figure 2A:
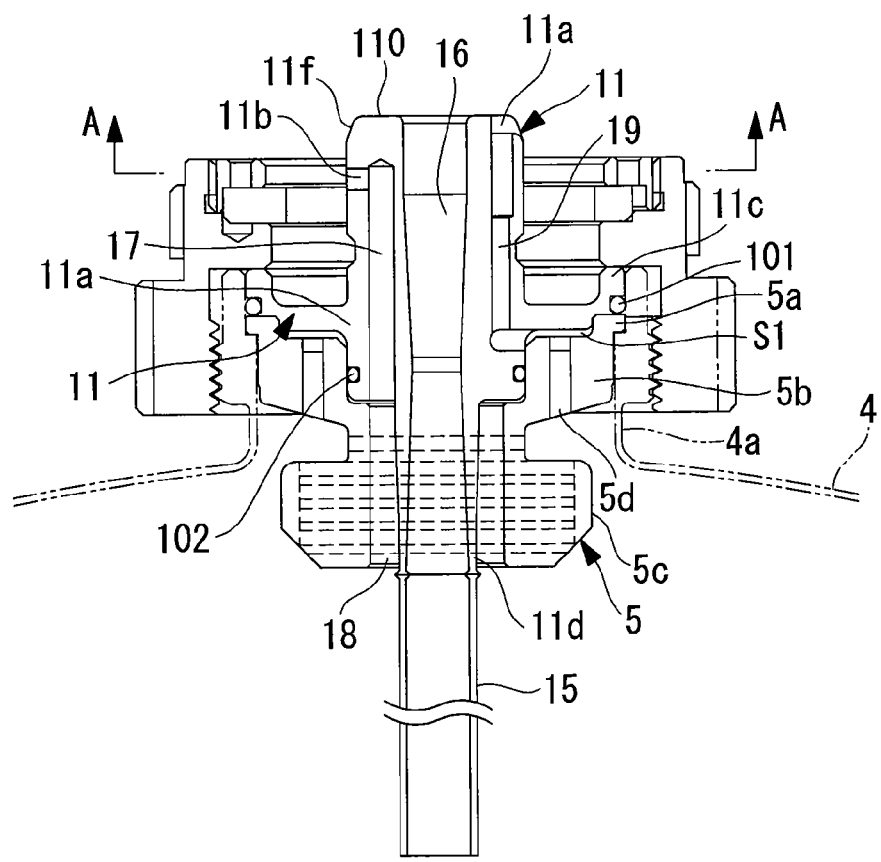
FIG. 2A is a schematic diagram showing the longitudinal-sectional configuration of a plug.

FIG. 1 is a schematic diagram showing the longitudinal-sectional configuration of a container equipped with a joint according to this embodiment. FIG. 2A shows a schematic diagram of the longitudinal-sectional configuration of a plug that constitutes the joint. FIGS. 3 to 6 show schematic diagrams showing the longitudinal-sectional configuration illustrating, in stages, the states from before the plug and a socket are connected until the connection is completed. FIGS. 7A and 7B show the shape of the end of a liquid discharge tube.

The joint (coupling device) is provided at an outer-container mouth (mouth) 4a of a container 2 in which liquid and gas are contained. Although the configurations of a plug 11 and a lid 61 described in a second embodiment are described here as the joint in FIG. 1, this embodiment differs in that a socket (fitted member) 41, to be described later, is provided instead of the lid 61.

As shown in FIGS. 3 to 6, the joint 1 of this embodiment is equipped with the plug 11 and the socket 41 that fits on the plug 11. The plug 11 and the socket 41 are connected to an outer-container mouth 4a of a container 2 via a securing nut 21.

As shown in FIG. 1, the container 2 is equipped with a flexible liner (flexible container) 3 and an outer container 4. The liner 3 is constituted by a flexible film bag formed of an inert material and a liner bracket 5 formed of relatively hard synthetic resin. The liner bracket 5 is welded to the end of the flexible film bag. The liner 3 is cleaned in advance and is accommodated in the outer container 4. After liquid is discharged from the liner 3, the liner 3 is discarded together with the liner bracket 5, and a new liner 3 is accommodated in the outer container 4 together with a new liner bracket 5.

The outer container 4 is an aluminum canister. The outer container 4 accommodates the liner 3 while supporting the liner bracket 5 using the outer-container mouth 4a. The outer wall of the outer-container mouth 4a has an external thread. The outer container 4 is a composite storage container which is repeatedly used and in which a new liner 3 is accommodated every time.

As shown in FIG. 2A, the liner bracket 5 has a liner bracket flange 5a, and the inner wall of the outer-container mouth 4a has a level difference. The liner bracket flange 5a is retained by the level difference provided at the inner wall of the outer-container mouth 4a, so that the liner bracket 5 is supported by the outer-container mouth 4a.

After the liner 3 (see FIG. 1) is accommodated in the outer container 4, and the liner bracket 5 is supported by the outer-container mouth 4a, the liner 3 is expanded by, preferably, nitrogen or compressed air. After the liner 3 is expanded, liquid is poured into the liner 3 through a liquid passage 16 and a liquid discharge tube 15, to be described later.

As shown in FIG. 2A, the liner bracket 5 is substantially cylindrical. The substantially cylindrical liner bracket 5 is recessed at a substantially central portion in the axial direction of the outer wall thereof. The recess at the substantially central portion defines the upper part of the liner bracket 5 as an upper liner bracket 5b and the lower part as a lower liner bracket 5c. As shown in FIG. 1, an end of the flexible film bag is welded to the lower liner bracket 5c.

The upper liner bracket 5b has a liner bracket flange 5a at the rim of the upper surface thereof. The outside diameter of the upper liner bracket 5b is slightly smaller than the inside diameter of the outer-container mouth 4a. The liner bracket flange 5a slightly protrudes upward from the upper surface of the upper liner bracket 5b. Therefore, a plug flange 11c, to be described later, is supported by the liner bracket flange 5a, so that a space S1 is formed between the upper surface of the upper liner bracket 5b and the lower surface of the plug flange 11c.

The inner wall of the opening of the substantially cylindrical upper liner bracket 5b is provided with a level difference. The level difference formed at the inner wall of the opening receives the lower part of a plug cylinder 11a. The upper liner bracket 5b has a plurality of liner-bracket fluid passages 5d at substantially regular intervals around the circumference of the opening. The liner-bracket fluid passages 5d are provided at a plurality of locations (for example, four locations) in the axial direction of the upper liner bracket 5b and pass through the upper liner bracket 5b. The individual liner-bracket fluid passages 5d communicate with an inner space between the outer container 4 and the liner 3 (see FIG. 1).

The plug 11 is equipped with the cylindrical plug cylinder 11a having a liquid passage 16 that communicates with liquid in the liner 3 to let in and out the liquid in the liner 3 and gas passages 17 that communicate with gas in the liner 3 to let in and out the gas in the liner 3, and openings 11b that communicate with the gas passages 17 and open to the outer wall of the plug cylinder 11a.

The plug cylinder 11a has fluid passages 19 that communicate between the outer container 4 and the liner 3 so that liquid is let in and out between the outer container 4 and the liner 3 and fluid-passage unsealing means 11f for releasing the seal of the fluid passages 19.

The plug cylinder 11a has the plug flange 11c protruding in the radial direction from the substantially central portion in the axial direction of the substantially cylindrical plug cylinder 11a. The plug cylinder 11a has a top face 110 of the cylinder (the upper surface of the plug cylinder 11a in FIG. 2A). The corner (fluid-passage unsealing means) 11f formed by the top face 110 and the outer wall of the plug cylinder 1a is chamfered. The chamfered corner 11f forms a gentle curved surface.

The plug cylinder 11a is supported from below by the liner bracket flange 5a via the plug flange 11c. Thus, the plug 11 is retained by the outer-container mouth 4a. An O-ring 101 is held between the plug flange 11c and the liner bracket flange 5a. Thus, the outer-container mouth 4a is sealed.

The plug cylinder 11a is provided with a plug protruding portion 11d protruding from the bottom surface of the cylinder toward the bottom of the liner 3 (see FIG. 1). The liquid passage 16 passes through the center of the plug cylinder 11a and the plug protruding portion 11d in the axial direction thereof.

The part of the plug cylinder 11a below the plug flange 11c is inserted into the opening of the upper liner bracket 5b. The plug cylinder 11a inserted into the opening of the upper liner bracket 5b is retained by the level difference provided on the inner wall of the opening. An O-ring 102 is held between the outer wall of the plug cylinder 11a and the inner wall of the opening of the upper liner bracket 5b. When the O-ring 102 comes into close contact with the outer wall of the lower part of the plug cylinder 11a, the gas can be sealed in the liner 3.

Since the plug protruding portion 11d is inserted from above the opening of the upper liner bracket 5b, a ring-shaped passage 18 is formed between the plug protruding portion 11d and the inner wall of the opening of the lower liner bracket 5c. This ring-shaped passage 18 communicates with the gas passages 17 provided in the plug cylinder 11a. Thus, the gas in the liner 3 is let out through the ring-shaped passage 18 and then the gas passages 17.

The liquid discharge tube 15 is welded to the extension end of the plug protruding portion 11d. As shown in FIG. 1, the liquid discharge tube 15 extends from the opening of the lower liner bracket 5c to the vicinity of the bottom in the liner 3. The liquid in the liner 3 is let out through the liquid discharge tube 15 and the liquid passage 16. In this case, it is preferable that the liquid discharge tube 15 be as long as possible, within a range in which it is not in contact with the outer container 4 so that no liquid remains in the flexible liner 3.

For the end shape of the liquid discharge tube 15, as shown in FIGS. 7A and 7B, a plurality of circular holes 15a are provided in the side wall thereof so as not to be in contact with the end. Providing the plurality of circular holes 15a in the side wall as described above increases the effective area for letting out a chemical solution (liquid), thus allowing the chemical solution to be let out without blocking the holes 15a when the liner 3 contracts. This can reduce the amount of liquid remaining in the liner 3.

In the case where the end of the liquid discharge tube 15 is cut off so as to be perpendicular to the axial direction of the liquid discharge tube 15 (in the case where the end of the liquid discharge tube 15 is cut off horizontally in FIGS. 7A and 7B), when the flexible liner 3 contracts, the end of the liquid discharge tube 15 is sometimes blocked. In the case where the end of the liquid discharge tube 15 is diagonally cut with respect to the axial direction, the effective area can be increased, but there is a risk of puncturing the flexible liner 3. However, providing the circular holes 15a at the end of the liquid discharge tube 15, as shown in FIGS. 7A and 7B, prevents the flexible liner 3 from being punctured by the liquid discharge tube 15 and allows the amount of liquid remaining in the liner 3 to be reduced as much as possible.

Figure 2B:
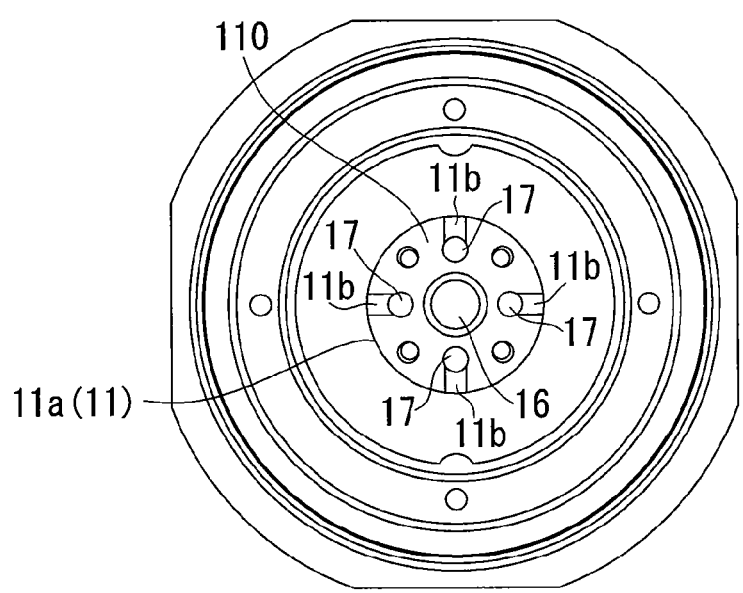
FIG. 2B is a schematic diagram showing the configuration of a cross section taken along A-A in FIG. 2A.
Figure 2C:
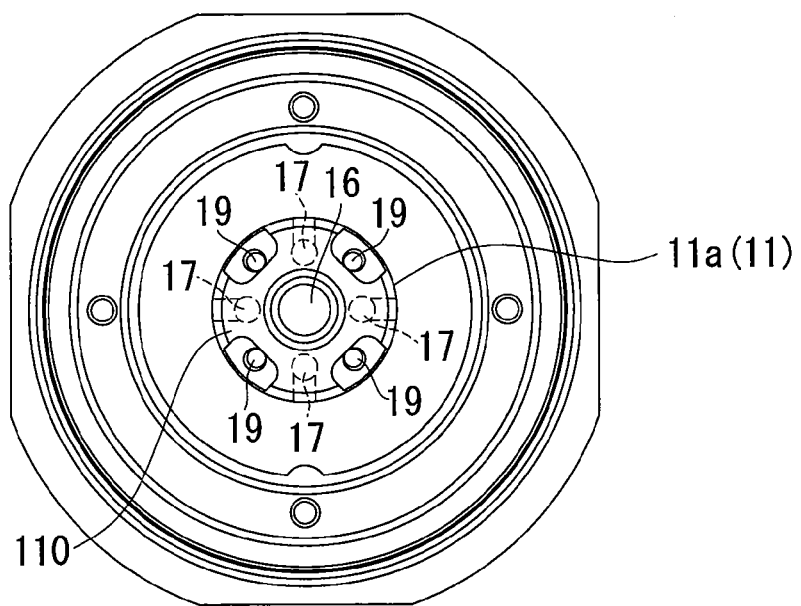
FIG. 2C is a schematic diagram showing the configuration in FIG. 2A, as viewed from above.

As shown in FIGS. 2A to 2C, the plug cylinder 11a is provided with the plurality of (for example, four) gas passages 17 around the circumference of the liquid passage 16. As shown in FIG. 2B, the plurality of gas passages 17 are disposed at a predetermined angle (for example, at substantially 90°) at substantially regular intervals around the circumference of the liquid passage 16 when a cross section, taken along A-A, of the plug 11 is viewed from above. The individual gas passages 17 pass through the plug cylinder 11a so as to be substantially parallel to the liquid passage 16 from the bottom surface of the lower end of the plug cylinder 11a to the vicinity of the top face 110. The individual gas passages 17 communicate with the openings 11b that open to the outer wall of the plug cylinder 11a, in the vicinity of the top face 110 of the plug cylinder 11a. This allows the gas in the liner 3 (see FIG. 1) and the air to be effectively communicated.

Furthermore, the plug cylinder 11a is provided with the plurality of (for example, four) fluid passages 19 around the circumference of the liquid passage 16. As shown in FIG. 2C, the plurality of fluid passages 19 are disposed at predetermined angles (for example, at substantially 90°) at substantially regular intervals around the circumference of the liquid passage 16 when the plug 11 is viewed from above.

The fluid passages 19 and the gas passages 17 are concentrically provided around the circumference of the liquid passage 16. The fluid passages 19 are provided substantially outside the gas passages 17 in such a manner that each fluid passage 19 is located between two gas passages 17.

Accordingly, the angle formed by a straight line connecting the axis of the fluid passages 19 and the axis of the plug cylinder 11a and a straight line connecting the axis of the gas passages 17 and the axis of the plug cylinder 11a is a predetermined angle (for example, substantially 45°). In other words, the fluid passages 19 and the gas passages 17 are provided at predetermined angles (for example, substantially 45°) in the circumferential direction around the axis of the plug cylinder 11a.

The individual fluid passages 19 pass through the plug cylinder 11a so as to be substantially parallel to the liquid passage 16 from the vicinity of the bottom surface of the plug cylinder 11a to the top face 110. Here, the vicinity of the bottom surface of the plug cylinder 11a is the vicinity of the lower surface of the plug flange 11c, as shown in FIG. 2A.

Since the plug 11 is supported by the liner bracket 5 from below, as shown in FIG. 2A, the predetermined space 51 is provided between the lower surface of the plug flange 11c and the upper surface of the upper liner bracket 5b. The individual fluid passages 19 substantially communicate with the inner space between the outer container 4 and the liner 3 (see FIG. 1) via the space S1.

Figure 3:
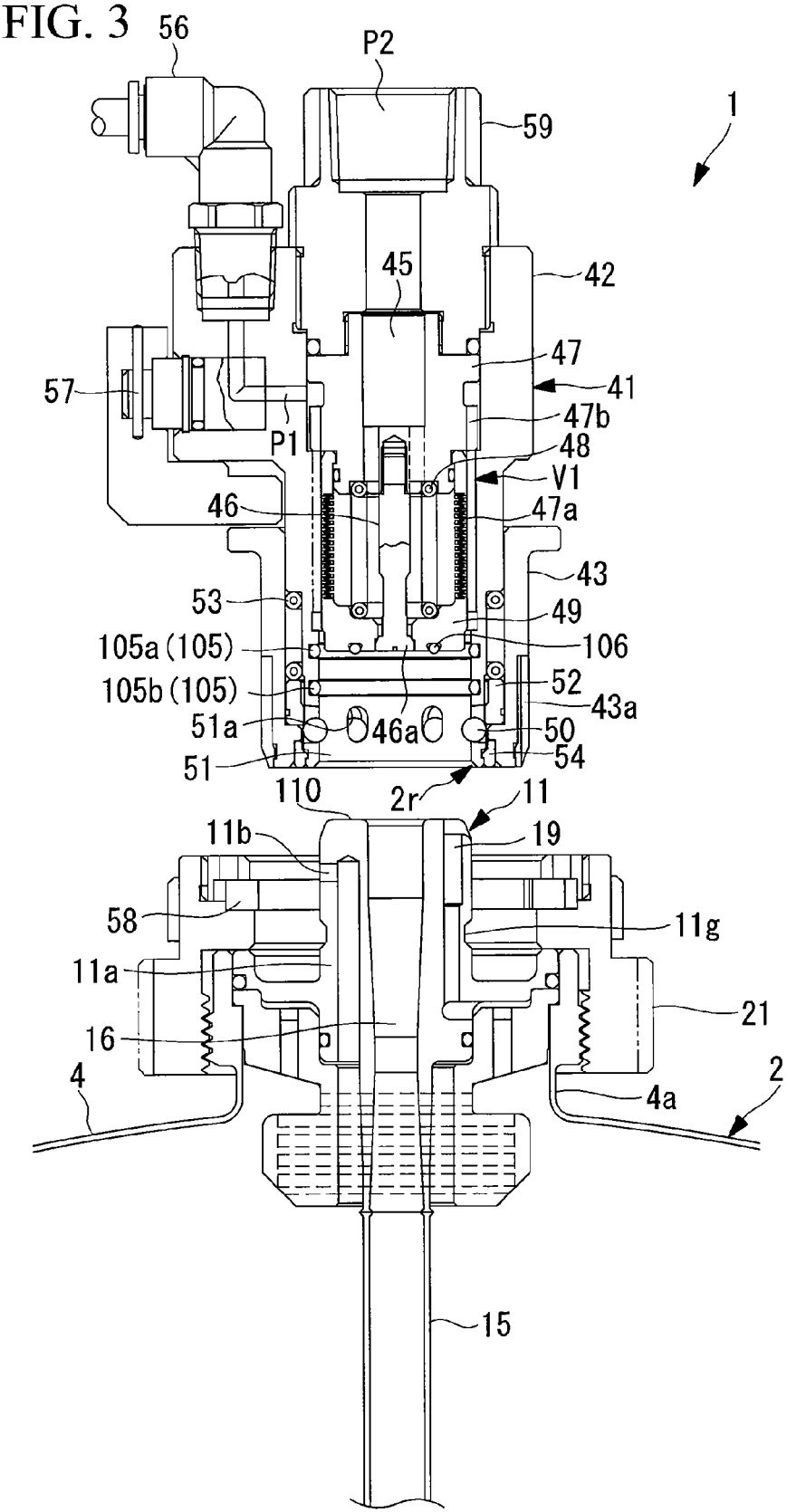
FIG. 3 is a schematic diagram showing the longitudinal-sectional configuration in a state before the plug and the socket are connected together.

As shown in FIG. 3, the socket 41 constituting the joint 1 includes a cylindrical socket main body (socket cylinder) 42 that slides on the outer wall of the plug cylinder 11a in the axial direction of the plug cylinder 11a, O-rings (opening sealing means) 105 provided at the socket main body 42 and sealing the openings 11b of the plug cylinder 11a, a valve mechanism (liquid-passage sealing means) V1 provided in the socket main body 42 and sealing the liquid passage 16 of the plug cylinder 11a, and a cock (fluid-passage unsealing means) 57 provided at the socket main body 42 and releasing the seal of the fluid passages 19 of the plug cylinder 11a.

The joint 1 of this embodiment can distribute liquid in the liner 3 by connecting the socket 41 without the lid 61 shown in FIG. 1.

The socket main body 42 is cylindrical. The outer wall of the lower portion of the cylindrical socket main body 42 is smaller than the outside diameter of the outer wall of the upper portion. This forms a level difference at the portion with a different outside diameter of the socket main body 42. The socket main body 42 holds the O-rings 105 on the inner wall surface of the lower end thereof.

The O-rings 105 are provided at two locations. O-rings 105a and 105b are in close contact with the outer wall of the plug cylinder 11a to prevent gas from being let in and out from the openings 11b. The O-rings 105a and 105b are provided at such a separation that they are disposed on either side of the openings 11b when the connection between the socket 41 and the plug 11 is completed.

The socket main body 42 accommodates the valve mechanism V1. The valve mechanism V1 accommodated in the socket main body 42 is substantially cylindrical. The substantially cylindrical valve mechanism V1 is provided with a valve-mechanism liquid passage 45 formed of the inner wall thereof, a valve 46 disposed in the valve-mechanism liquid passage 45, an inner sleeve 47, a valve-mechanism compression coil spring 48, and a joint seat 49.

The inner sleeve 47 accommodates part of the valve-mechanism liquid passage 45, and a barrel 47a thereof has extendable bellows. The outer wall of the inner sleeve 47 has a plurality of slits 47b. The slits 47b pass through in the axial direction of the inner sleeve 47 to the vicinity of the upper end face of the inner sleeve 47. The lower ends of the slits 47b communicate with the fluid passages 19 provided in the plug cylinder 11a, and the other ends of the slits 47b are connected to an inlet/outlet port P1 when the connection between the socket 41 and the plug 11 is completed.

The lower end of the inner sleeve 47 is provided with a seat 47c (see FIG. 6) with which a valve element 46a of the valve 46 comes into contact. The valve 46 is disposed in the valve-mechanism liquid passage 45. The valve 46 has the valve element 46a at the end thereof. The valve-mechanism compression coil spring 48 applies force so that the inner sleeve 47 extends in the axial direction. The joint seat 49 is connected to the seat 47c of the inner sleeve 47. The joint seat 49 is urged toward the top face 110 of the plug cylinder 11a to come into contact therewith.

The lower end face of the inner sleeve 47 (the surface that comes into contact with the top face 110 of the plug cylinder 11a) is provided with an O-ring 106. The O-ring 106 is provided around the outer periphery of the valve-mechanism liquid passage 45 formed in the inner sleeve 47. Providing the O-ring 106 around the outer periphery of the valve-mechanism liquid passage 45 prevents liquid from flowing out of the valve-mechanism liquid passage 45 and gas from flowing into the valve-mechanism liquid passage 45 when the socket 41 and the plug 11 are joined together.

The outside diameter of the inner sleeve 47 is slightly smaller than the inside diameter of the part of the socket main body 42 corresponding to the inner sleeve 47. A discharge port member 59, to be described later, is provided at the upper end face of the inner sleeve 47. Since the discharge port member 59 is provided at the upper end face of the inner sleeve 47, the inner sleeve 47 is fixed in the socket main body 42.

The discharge port member 59 is substantially cylindrical, the inner wall of which communicates with the valve-mechanism liquid passage 45 formed in the inner sleeve 47. The surface opposite to the surface in contact with the inner sleeve 47 has a discharge port P2 for liquid guided from the inner wall of the discharge port member 49.

The socket main body 42 is urged toward the top face 110 of the plug cylinder 11a to come into close contact therewith by the valve mechanism V1. Since the socket main body 42 is urged by the top face 110 of the plug cylinder 11a to come into close contact with the top face 110, the liquid distributed from the liner 3 (see FIG. 1) can be can be let in and out through the liquid passage 16 in the plug cylinder 11a and the valve-mechanism liquid passage 45 provided in the valve mechanism V1.

A sleeve 43 is held on the outer wall of the lower part of the socket main body 42. The sleeve 43 is substantially cylindrical. The inner wall of the sleeve 43 has an inwardly protruding level difference. The sleeve 43 has a plurality of slits (recessed portions) 43a recessed in a predetermined shape in the outer wall thereof. The plurality of slits 43a are provided in the axial direction of the sleeve 43. The slits 43a are shaped so as to be engageable with a key ring (protruding portion) 58 provided at the inner wall of the securing nut 21.

The sleeve 43 has a locking mechanism 2r that can detachably retain the plug cylinder 11a so as to cover it at the level difference of the inner wall of the sleeve 43. The locking mechanism 2r has a plurality of balls 50, a ball retainer 51, and a slide ring 52. The locking mechanism 2r is a so-called ball catch that uses balls 50 as locking devices.

The slide ring 52 is substantially cylindrical. The substantially cylindrical slide ring 52 is disposed between the socket main body 42 and the sleeve 43. The slide ring 52 urges the plurality of balls 50 toward the lower end of the sleeve 43 to push them in a direction in which the circle formed by the plurality of balls 50 decreases in diameter. The outer wall of the plug cylinder 11a has a ring-shaped retaining groove 11g in which the plurality of balls 50 are retained, so that the socket 41 is detachably connected to the plug 11.

The ball retainer 51 is constituted by part of the socket main body 42. The plurality of balls 50 are held between the ball retainer 51 and the sleeve 43. The ball retainer 51 and the sleeve 43 are joined together by a substantially cylindrical clip ring 54 so that the ball retainer 51 and the sleeve 43 are not separated.

The plurality of balls 50 are disposed on the inner wall of the sleeve 43 adjacent to the lower end. The plurality of balls 50 are retained by the ball retainer 51. The ball retainer 51 has a plurality of mating holes 51a that permit the plurality of balls 50 to move only in the axial direction and to extend and contract relative to the outer wall of the ball retainer 51.

The level difference of the inner wall of the sleeve 43 accommodates the slide ring 52 and a locking-mechanism compression coil spring 53. The locking-mechanism compression coil spring 53 urges the slide ring 52 toward the level difference provided at the inner wall of the sleeve 43. The locking-mechanism compression coil spring 53 and the slide ring 52 accommodated in the level difference provided at the inner wall of the sleeve 43 are surrounded by the socket main body 42 and the inner wall of the sleeve 43.

The outer wall of the upper part of the socket main body 42 is provided with a liner-pressing connecting portion 56 that supplies (lets in) external pressure (fluid) to the inner space between the outer container 4 and the liner 3 (see FIG. 1) through the socket main body 42 and the plug 11. The liner-pressing connecting portion 56 communicates with the inlet/outlet port P1 formed in the socket main body 42.

The outer wall of the upper part of the socket main body 42 is provided with a cock 57 that releases the external pressure sealed in the inner space between the outer container 4 and the liner 3. By turning the cock 57, the inner space communicates with the inlet/outlet port P1 so that the external pressure in the inlet/outlet port P1 can be released (let out). In the case where external pressure is supplied to the inner space between the outer container 4 and the liner 3, the releasing (letting out) of the external pressure in the inlet/outlet port P1 is stopped by turning the cock 57.

The securing nut 21 connects the plug 11 and the socket 41 to the outer-container mouth 4a of the container 2. For connecting the socket 41, the key ring 58 is provided on the inner wall of the securing nut 21. The key ring 58 is shaped so as to be engageable with the slits 43a formed in the outer wall of the sleeve 43. The key ring 58 is a ring-shaped misconnection prevention means. The key ring 58 and the slits 43a have predetermined shapes, and thus, even if there are a plurality of types of socket 41, an error in attaching the socket 41 to the plug 11 can be prevented.

Next, the procedure for attaching the socket 41 will be described using FIGS. 3 to 6.

Figure 4:
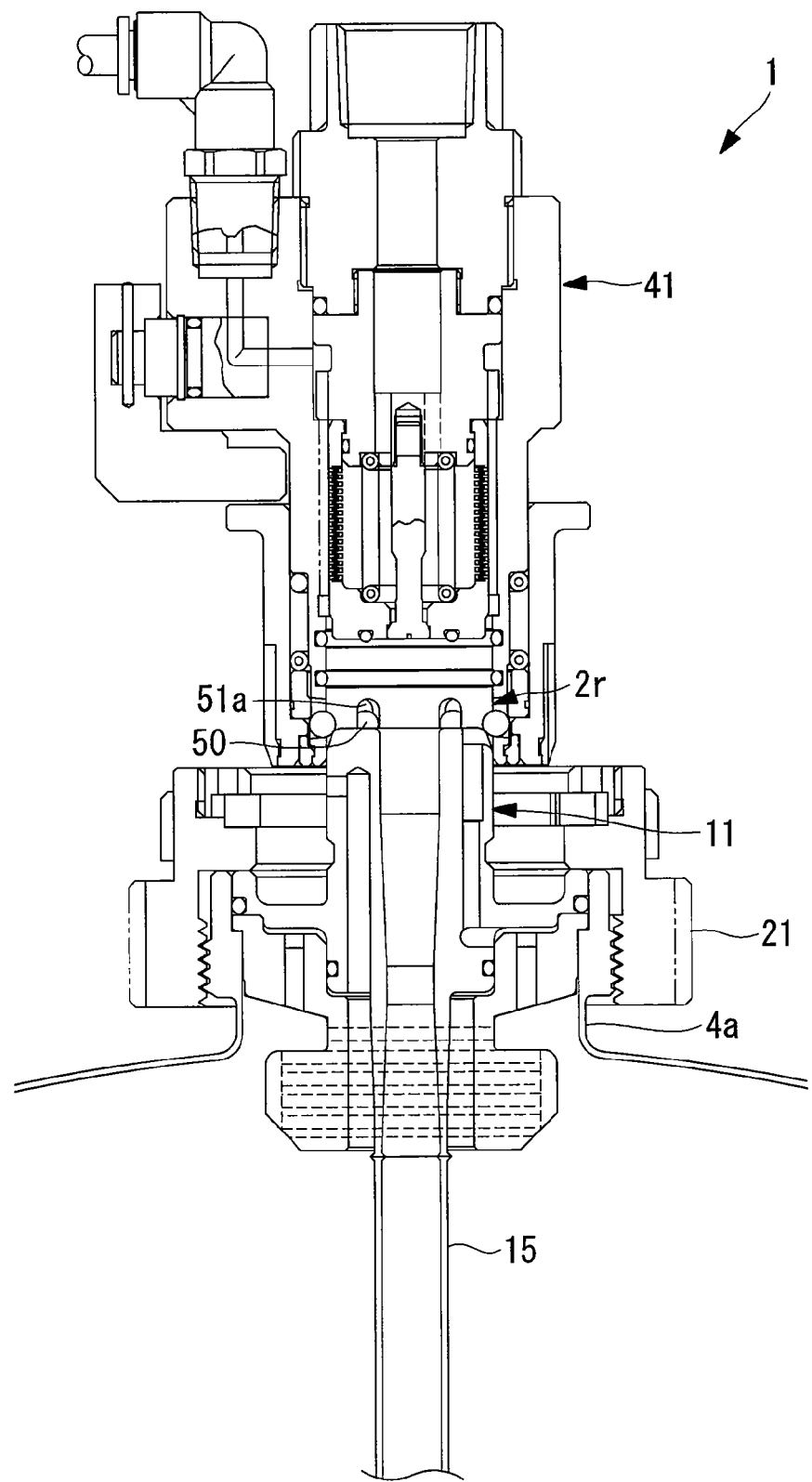
FIG. 4 is a schematic diagram showing the longitudinal-sectional configuration in a state in which the socket is mounted on the plug.

FIG. 3 shows a state in which the socket 41 is separated from the plug 11, and FIG. 4 shows a state in which the socket 41 is mounted on the plug 11.

The socket 41 is mounted on the plug 11 connected to the outer-container mouth 4a. At this time, the plurality of balls 50 of the locking mechanism 2r provided in the socket 41 partly protrude from the mating holes 51a.

Figure 5:
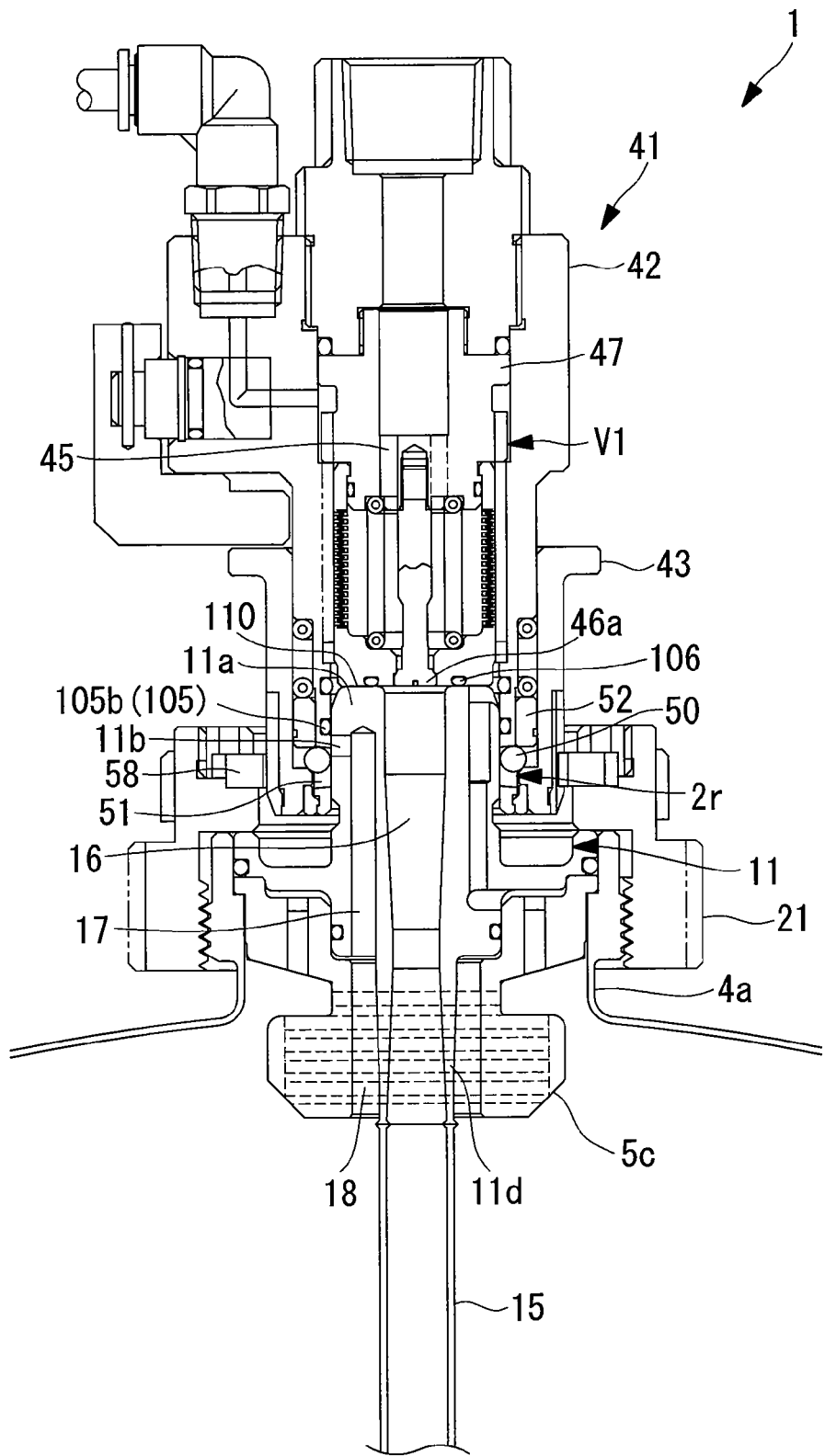
FIG. 5 is a schematic diagram showing the longitudinal-sectional configuration in a state in which the socket is inserted into the plug.

FIG. 5 shows a state in which the socket 41 is inserted into the plug 11.

By inserting the socket 41 into the plug 11, the valve mechanism V1 accommodated in the socket main body 42 is urged toward the top face 110 of the plug cylinder 11a. Since the valve mechanism V1 is urged toward the top face 110 of the plug cylinder 11a, the lower end face of the socket main body 42 and the top face 110 of the plug cylinder 11a come into close contact with each other. At that time, the valve element 46a of the valve mechanism V1 is in contact with the seat 47c (see FIG. 6) provided at the inner sleeve 47, so that the valve-mechanism liquid passage 45 in the valve mechanism V1 is blocked.

The end of the ball retainer 51 is urged toward the top face 110 of the plug cylinder 11a. Therefore, the plurality of balls 50 of the locking mechanism 2r provided at the socket 41 move backward while being guided by the mating holes 51a (see FIG. 4). The slide ring 52 also moves backward with the backward motion of the plurality of balls 50. When the slide ring 52 moves back a fixed distance, the plurality of balls 50 move to the space from which the slide ring 52 moved back. In other words, the plurality of balls 50 move in the direction in which the circle formed by the balls 50 increases in diameter, so that some of the plurality of balls 50 moves backward from the corresponding mating holes 51a.

Figure 6:
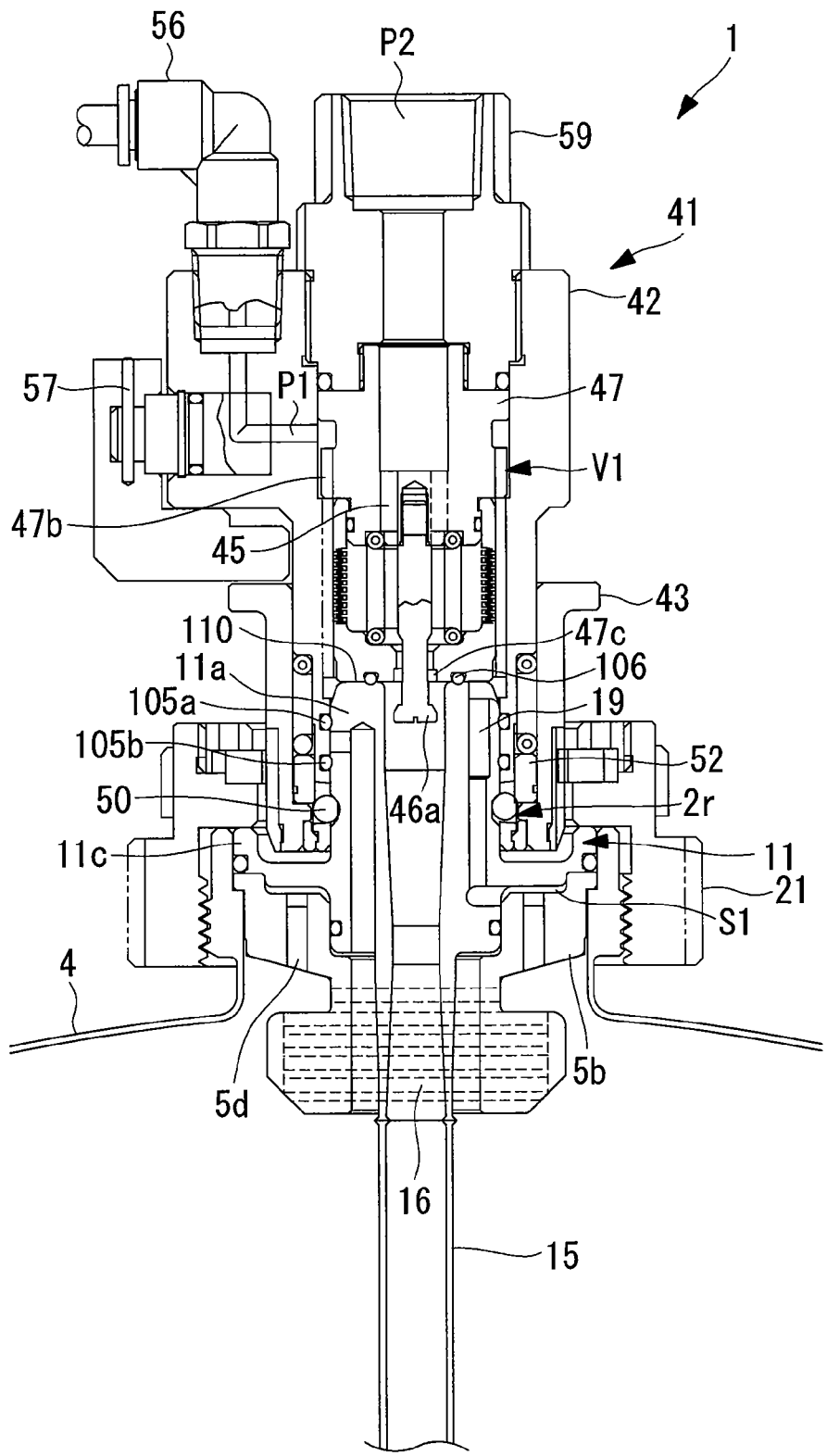
FIG. 6 is a schematic diagram showing the longitudinal-sectional configuration in a state in which the connection between the plug and the socket is completed.
Figure 7A:
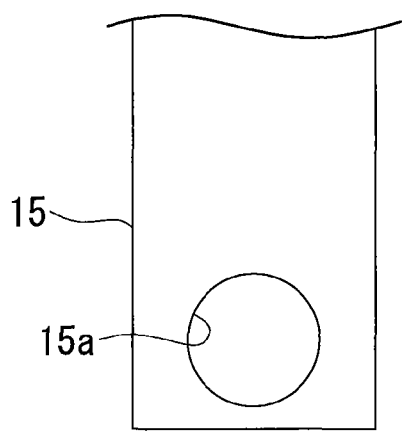
FIG. 7A is a partial enlarged diagram showing the shape of the end of a liquid discharge tube.
Figure 7B:
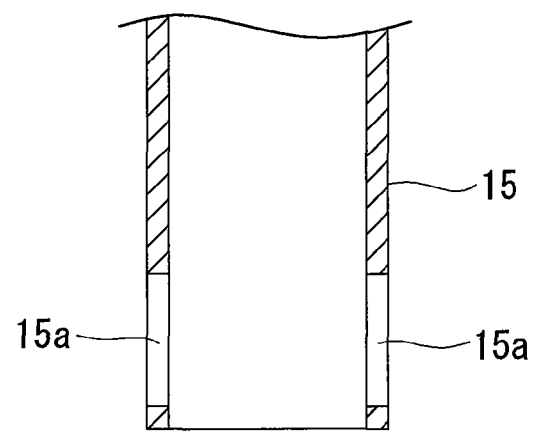
FIG. 7B is a partial enlarged diagram showing the shape of the end of the liquid discharge tube.

FIG. 6 shows a state in which the socket 41 is further inserted into the plug 11 to complete the connection between the plug 11 and the socket 41.

Since the socket 41 is further inserted into the plug 11, the valve element 46a is separated from the seat 47c of the valve mechanism V1 provided in the socket main body 42. This allows the valve-mechanism liquid passage 45 in the valve mechanism V1 to circulate liquid. The sleeve 43 becomes retained by the plug cylinder 11a, as will be described later, and thus, the liquid discharge tube 15, the liquid passage 16, and the valve-mechanism liquid passage 45 of the valve mechanism V1 are directly connected, thus allowing the liquid distributed from the liner 3 (see FIG. 1) to be received.

As described above, the plurality of balls 50 of locking mechanism 2r provided in the socket 41 reach the ring-shaped retaining groove 11g (see FIG. 3) provided in the plug cylinder 11a. Therefore, the slide ring 52 is urged, so that the balls 50 are fitted in the retaining groove 11g provided in the plug cylinder 11a to come into a locked state.

Next, the flow of fluid, gas, and liquid when the liquid in the liner 3 is let out from the socket 41 will be described using FIG. 6.

External pressure (fluid) is supplied through the liner-pressing connecting portion 56 provided at the socket main body 42. The external pressure is guided from the liner-pressing connecting portion 56 to the inlet/outlet port P1 formed in the socket main body 42. Since the insertion of the socket 41 into the plug 11 is completed, the inlet/outlet port P1 leads to the plurality of slits 47b formed in the outer wall of the inner sleeve 47.

The external pressure guided to the plurality of slits 47b is guided from the top face 110 of the plug cylinder 11a to the fluid passages 19 provided in the plug cylinder 11a. Since the lower end face of the inner sleeve 47 has the O-ring 106, the lower end face of the inner sleeve 47 and the top face 110 of the plug cylinder 11a are in close contact with each other. The two O-rings 105a and 105b provided at the end of the socket main body 42 adjacent to the opening bring the end of the socket main body 42 adjacent to the opening and the side wall of the plug cylinder 11a into close contact with each other. Therefore, the external pressure guided from the slits 47b is guided to the fluid passages 19 while being sealed by the O-ring 106 and the upper O-ring 105a.

The external pressure guided to the fluid passages 19 is guided to the space S1 formed between the upper surface of the upper liner bracket 5b and the lower surface of the plug flange 11c. The external pressure guided to the space S1 is guided to the inner space between the outer container 4 and the liner 3 (see FIG. 1) through the liner-bracket fluid passages 5d provided in the upper liner bracket 5b.

The external pressure guided to the inner space acts on the liner 3. Therefore, the liquid in the liner 3 is guided to the liquid discharge tube 15 and the liquid passage 16. The liquid guided to the liquid passage 16 is guided to the valve-mechanism liquid passage 45 formed in the valve mechanism V1 because the valve element 46a is separated from the seat 47c provided at the socket main body 42. The liquid guided to the valve-mechanism liquid passage 45 is let out from the discharge port P2 provided in the discharge port member 59 communicating with the valve-mechanism liquid passage 45.

Next, the flow of fluid, gas, and liquid when the socket 41 is removed from the plug 11 will be described using FIGS. 5 and 6.

In FIG. 6, external pressure supplied through the liner-pressing connecting portion 56 is stopped. The external pressure in the inlet/outlet port P1 is released (let out) by turning the cock 57 provided at the socket main body 42. Thus, the pressure in the slits 47b of the inner sleeve 47, the pressure in the fluid passages 19 of the plug cylinder 11a, and the pressure in the inner space between the outer container 4 and the liner 3 (see FIG. 1) are immediately equalized with atmospheric pressure.

As shown in FIG. 5, by pulling out (removing) the socket 41 from the plug 11, the end of the socket main body 42 adjacent to the opening slides on the outer wall of the plug cylinder 11a so as to come close to the top face 110 in the axial direction of the plug cylinder 11a. Since the lower O-ring 105b provided at the end of the socket main body 42 adjacent to the opening slides on the outer wall of the plug cylinder 11a in the axial direction of the plug cylinder 11a and passes through the openings 11, the seal of the openings 11b is released.

Since the seal of the openings 11b is released, the gas accommodated in the upper part of the liner 3 is guided to the openings 11b to be discharged (led out) through the ring-shaped passage 18 formed between the inner wall of the lower liner bracket 5c and the plug protruding portion 11d and then the gas passages 17. The gas discharged through the openings 11b passes through the ball retainer 51, the outer wall of the plug cylinder 11a, and the space between the ball retainer 51 and the sleeve 43, and then the space between the outer wall of the sleeve 43 and the key ring 58 and is discharged to the outside air.

The socket 41 is pulled out from the plug 11 with the strong force such that the plurality of balls 50 get over the retaining groove 11g (see FIG. 3). Thus, the socket 41 can be separated from the plug 11. By separating the socket 41 from the plug 11, the pressure in the liner 3 and the pressures in the liquid discharge tube 15 and the liquid passage 16 become equal to atmospheric pressure. This can prevent the liquid from being guided from the interior of the liner 3 through the liquid discharge tube 15 to the liquid passage 16 and being discharged and splashed outside the outer-container mouth 4a.

The O-ring 106 provided between the lower end face of the inner sleeve 47 and the top face 110 of the plug cylinder 11a can further prevent the liquid from being guided from the interior of the liner 3 through the liquid discharge tube 15 to the liquid passage 16 and being discharged and splashed outside the outer-container mouth 4a.

As described above, the joint 1 according to this embodiment offers the following operational advantages.

Because the plug 11 equipped with the gas passages 17, the fluid passages 19, and the liquid passage 16 is used, this can decrease the number of components that constitute the liquid passage 16, the gas passages 17, and the fluid passages 19. Accordingly, this can simplify the assembly process of the joint (coupling device) 1 and reduce the cost.

Since the plug 11 having the liquid passage 16, the gas passages 17, and the fluid passages 19 can be manufactured without sliding components, the occurrence of fine powder (particles) produced while the components slide can be prevented.

The gas passages 17 and the fluid passages 19 are provided at a predetermined angle so as to be concentric in the axial direction of the cylindrical plug cylinder 11a. This allows the gas passages 17 and the fluid passages 19 to be formed of a simple component, such as the plug cylinder 11a. This can therefore simplify the assembly process of the joint 1 and reduce the cost.

The socket (fitted member) 41 having the valve mechanism (liquid-passage sealing means) V1 that seals the liquid passage 16 of the plug 11 and the cock (fluid-passage unsealing means) 57 that releases the seal of the fluid passages 19 is used, the seal of the openings 11b is released by sliding the socket 41 in the axial direction of the plug cylinder 11a, the seal of the fluid passages 19 is released by rotating the cock 57, and thereafter, the valve mechanism V1 releases the seal of the liquid passage 16. This can therefore prevent the gas and liquid contained in the liner (flexible container) 3 from being let out together from the container 2. This can therefore prevent the liquid from splashing when let out from the container 2.

The socket 41, which is the fitted member, includes the cylindrical socket main body (socket cylinder) 42 that slides on the outer wall of the plug cylinder 11a in the axial direction of the plug cylinder 11a, the O-rings (opening sealing means) 105 provided at the socket main body 42 and sealing the openings 11b of the plug cylinder 11a, the valve mechanism V1 provided in the socket main body 42 and sealing the liquid passage 16 of the plug cylinder 11a, and the cock (fluid-passage unsealing means) 57 provided on the socket main body 42 and releasing the seal of the fluid passages 19. To remove the socket 41, after the seal of the openings 11b is released, and the seal of the fluid passages 19 is released, the socket 41 is removed. Therefore, after the external pressure (fluid) that acts on the liner 3 is released, the seal of the openings 11b is released, and the seal of the liquid passage 16 is released. Accordingly, this can prevent the gas and liquid from being let out together from the liner 3, thereby preventing the liquid from splashing when the socket 41 is removed from the plug 11.

The slits (recessed portions) 43a recessed in a predetermined shape are provided along the outer wall of the sleeve 43 provided on the socket main body 42, and the key ring (protruding portion) 58 that is engageable with the slits 43a of the sleeve 43 is provided on the inner wall of the cylindrical securing nut (connecting means) 21, in the axial direction, in which the socket 41 is inserted. Therefore, when the socket 41 is to be inserted into the securing nut 21, the socket 41 cannot be attached in the case where the shape of the key ring 58 of the securing nut 21 and the shape of the slits 43a of the sleeve 43 differ. This can therefore prevent an error in attaching the socket 41 to the plug 11 even if there are a plurality of kinds of socket 41.

Second Embodiment

A joint of this embodiment differs from the first embodiment in that it is equipped with a plug and a lid, and the remaining configuration is the same. Accordingly, the same components are given the same reference signs, and descriptions thereof will be omitted.

A second embodiment of the present invention will be described hereinbelow using FIG. 1 and FIGS. 8 to 10.

As shown in FIG. 1 and FIGS. 8 to 10, a joint 31 is equipped with the plug 11 and a lid (fitted member) 61 that fits on the plug 11.

The lid 61 has a cylindrical plug guide (sealing cylinder) 63 that slides on the outer wall of the plug cylinder 11a in the axial direction of the plug cylinder 11a, an O-ring (opening sealing means) 107 provided on the plug guide 63 and sealing the openings 11b of the plug cylinder 11a, and a plug bush (liquid-passage sealing means) 63b provided at the plug guide 63 and sealing the liquid passage 16 of the plug cylinder 11a.

The lid 61 is a dust-proof lid and is made of metal. The inner wall of the lid 61 is provided with an internal thread that screws on the securing nut (connecting means) 21. The lid 61 can move relative to the securing nut 21 so as to be separated from the outer-container mouth 4a. The securing nut 21 connects the plug 11 and the lid 61 to the outer-container mouth 4a of the container 2.

When the lid 61 is tightened, the inner bottom surface of the plug guide 63 comes into contact with the top face 110 of the plug cylinder 11a. The plug bush 63b and the plug guide 63 are preferably made of corrosive-resistant synthetic resin because it may come into contact with a chemical (liquid) contained in the liner (flexible container) 3.

The plug guide 63 has a U-shaped cross-section in the axial direction. The opening side of the U-shaped plug guide 63 protrudes to the interior of the lid 61. The surface of the plug guide 63 opposite to the opening (a surface in contact with the lid 61) has a plug guide flange 63a. The plug guide flange 63a is fixed to the lid 61 from the inside of the lid 61 via a disc-shaped holder 65 with a bolt (not shown).

The opening side of the plug guide 63 holds the O-ring 107 on the inner wall surface at the end thereof. The O-ring 107 is in close contact with the outer wall of the plug cylinder 11a, thereby preventing gas from flowing out through the openings 11b.

The plug bush 63b is provided at the center of the opening side of the plug guide 63. In other words, the plug bush 63b is a protruding portion that protrudes downward from the substantially central portion of the opening-side surface of the plug guide 63. The plug bush 63b is substantially cylindrical.

The end of the plug bush 63b is inserted into the liquid passage 16 that opens in the top face 110 of the plug cylinder 11a. The end of the plug bush 63b inserted into the liquid passage 16 is set slightly smaller than the inside diameter of the liquid passage 16. The plug bush 63b holds the O-ring 108 on the outer wall surface of the end thereof. The O-ring 108 is in close contact with the inner wall of the liquid passage 16, thereby preventing the liquid from flowing out from the liquid passage 16.

Next, the flow of fluid, gas, and liquid when the lid 61 is removed will be described using FIGS. 8 to 10.

Figure 8:
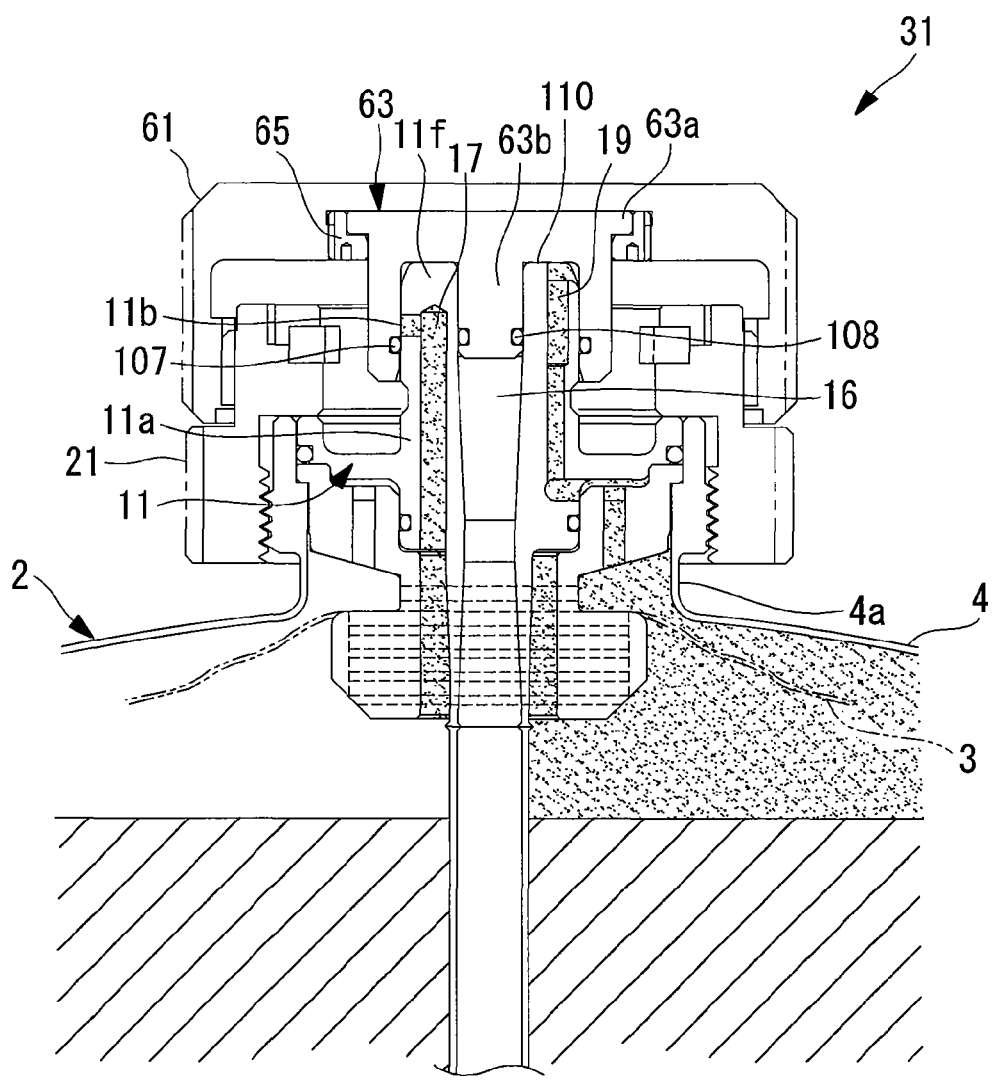
FIG. 8 is a longitudinal-section schematic configuration diagram showing a state in which a lid constituting the joint is attached.

FIG. 8 shows a case where the lid 61 is tightened, for example, during transportation.

The inner space between the outer container 4 and the liner 3 seals the outside air (fluid) when the lid 61 is closed. Gas given off by the liquid during transportation is stored at the upper part in the liner 3, and liquid is contained at the lower part thereof.

Since the lid 61 is tightened, the inner bottom surface of the plug guide 63 integrally provided on the lid 61 is in contact with the top face 110 of the plug cylinder 11a, and the end of the plug bush 63b is inserted in the liquid passage 16 of the plug cylinder 11a. The end of the plug guide 63 adjacent to the opening is located at a position at which it covers the openings 11b that open to the outer wall of the plug cylinder 11a. Therefore, ventilation of the outside air through the openings 11b and ventilation of the inside air (the gas in the liner 3) through the openings 11b are prevented by the O-ring 107 provided at the end of the plug guide 63 adjacent to the opening.

The O-ring 108 provided at the end of the plug bush 63b seals the space between the plug bush 63b and the inner wall that forms the liquid passage 16 of the plug cylinder 11a. Therefore, ventilation of the outside air to the liquid passage 16 and letting out of liquid from the liquid passage 16 are prevented.

As described above, the letting out of liquid through the outer-container mouth 4a and the letting out of the outside air (fluid) in the inner space between the outer container 4 and the liner 3 and the gas in the liner 3 are prevented.

Next, a case where the lid 61 is in a half-open state will be described. FIG. 9 shows a case where the lid 61 is in a half-open state.

In the case where the lid 61 is to be loosened into a half-open state, the lid 61 is moved relative to the securing nut 21 so as to be separated from the outer-container mouth 4a. Since the lid 61 moves so as to be separated from the outer-container mouth 4a, the end of the plug guide 63 adjacent to the opening, provided integrally with the lid 61, slides on the outer wall of the plug cylinder 11a in the axial direction of the plug cylinder 11a (upward in FIG. 9) so as to come close to the top face 110 of the plug cylinder 11a. Thus, the inner bottom surface of the plug guide 63 is separated from the top face 110 of the plug cylinder 11a.

The end of the plug bush 63b provided at the plug guide 63 slides on the inner wall of the liquid passage 16 of the plug 11 in the axial direction (upward in FIG. 9) so as to come close to the top face 110 of the plug cylinder 11a.

Since the O-ring 107 provided at the end of the plug guide 63 adjacent to the opening slides on the outer wall of the plug cylinder 11a in the axial direction of the plug cylinder 11a and passes through the openings 11b, the lid 61 is brought into a half-open state.

Since the O-ring 107 provided at the end of the plug guide 63 adjacent to the opening passes through the openings 11b, the seal of the openings 11b is released. Since the seal of the openings 11b is released, the gas contained at the upper part in the liner 3 passes through the ring-shaped passage 18 formed between the inner wall of the lower liner bracket 5c and the plug protruding portion 11d and then the gas passages 17 to the openings 11b and is discharged (let out). The gas discharged through the openings 11b is discharged to the outside air through the space between the lid 61 and the securing nut 21 screwed on the lid 61.

Next, a state immediately before the lid 61 is removed will be described. FIG. 10 shows a case immediately before the lid 61 is removed.

Figure 9:
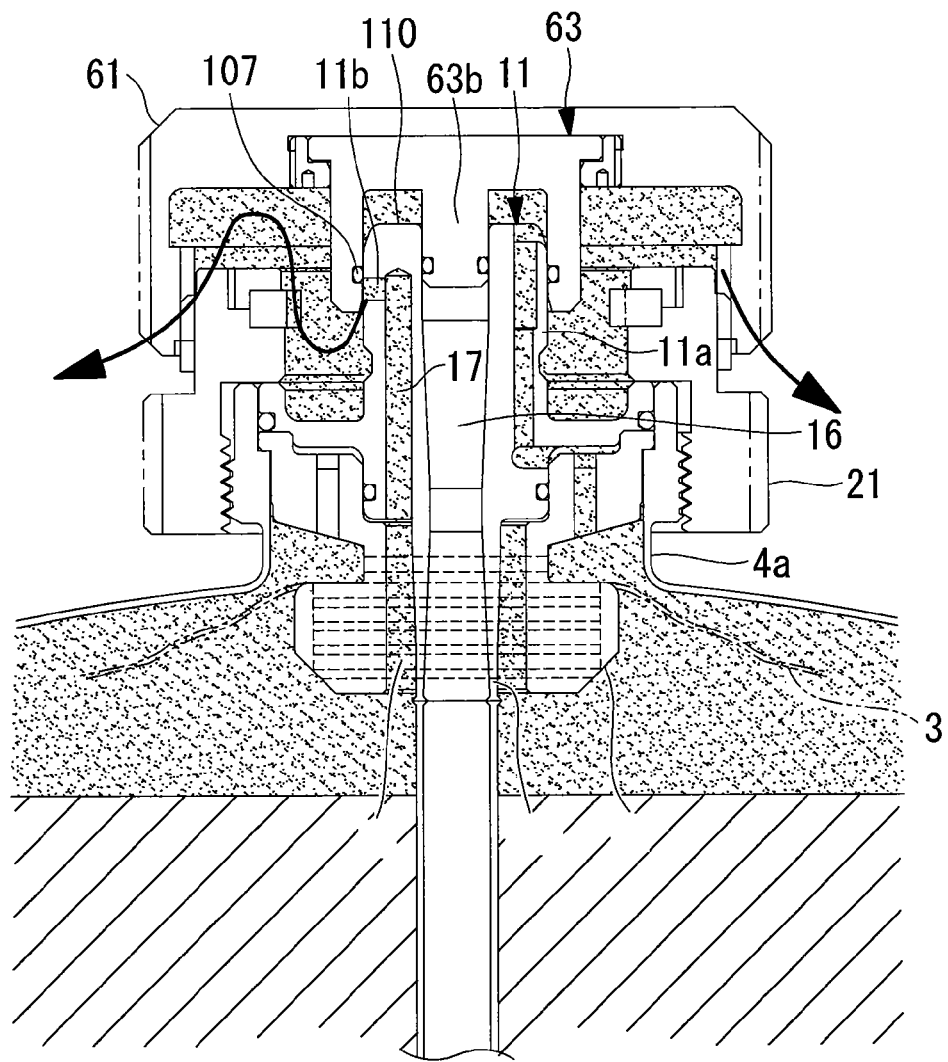
FIG. 9 is a schematic diagram showing the longitudinal-sectional configuration in a state in which the lid is in a half-open state.
Figure 10:
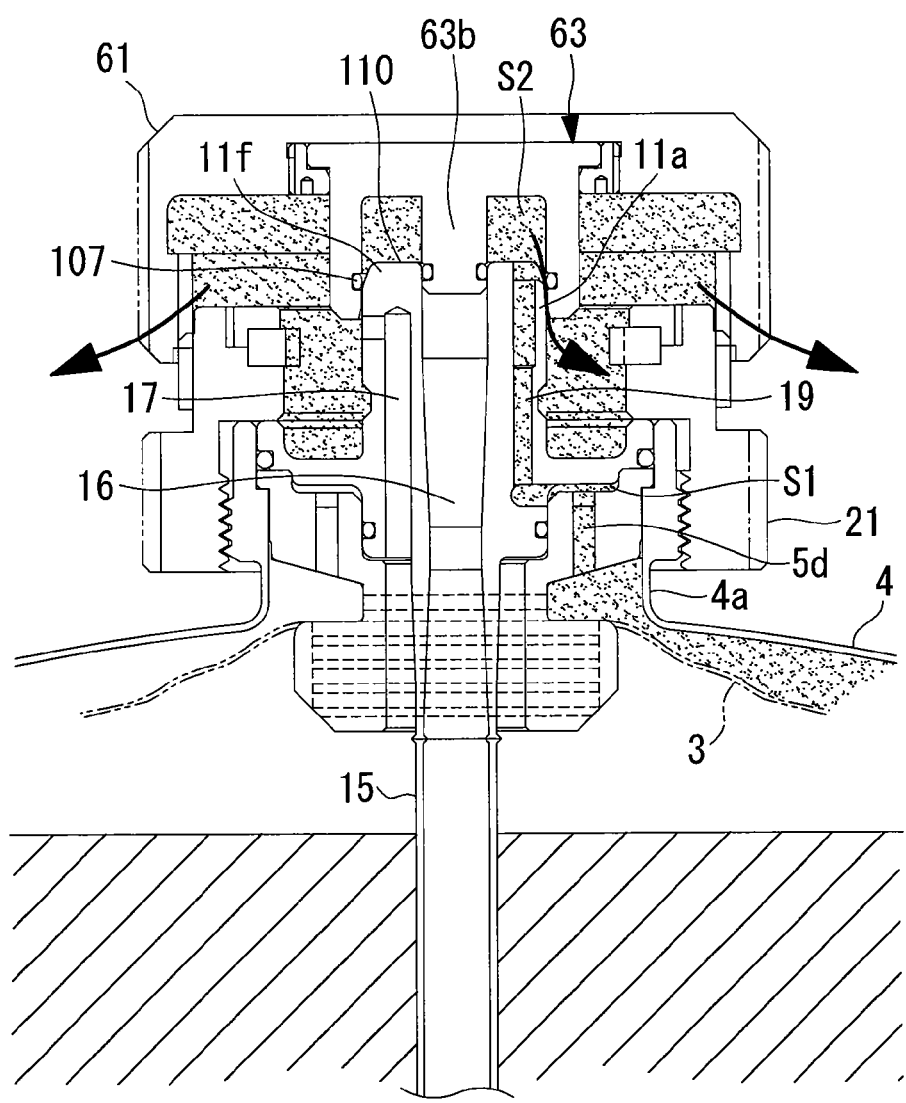
FIG. 10 is a schematic diagram showing the longitudinal-sectional configuration in a state immediately before the lid is removed.

To remove the lid 61, the lid 61 is further moved relative to the securing nut 21 from the state in FIG. 9 so as to be separated from the outer-container mouth 4a. Since the lid 61 further moves so as to be separated from the outer-container mouth 4a, the end of the plug guide 63 adjacent to the opening, integrally provided on the lid 61, slides on the outer wall of the plug cylinder 11a in the axial direction of the plug cylinder 11a so as to come even closer to the top face 110. The inner bottom surface of the plug guide 63 is further separated from the top face 110 of the plug cylinder 11*a*.

Since the corner 11*f* of the plug cylinder 11*a* is chamfered to form a gentle curved surface, the seal of the O-ring 107 provided at the end of the plug guide 63 adjacent to the opening is released when the end of the plug guide 63 adjacent to the opening slides to the corner 11*f*.

Since the seal of the O-ring 107 is released, the pressure in the space between the end of the plug guide 63 adjacent to the opening and the outer wall of the plug cylinder 11*a* is brought to the atmospheric pressure. This also makes the pressure in the space S2 between the inner bottom surface of the plug guide 63 and the top face 110 of the plug cylinder 11*a* atmospheric pressure. Therefore, the outside air sealed in the inner space between the outer container 4 and the liner 3 is guided through the liner-bracket fluid passages 5*d* and the space S1 to the fluid passages 19. The outside air guided to the fluid passages 19 is discharged from the top face 110 of the plug cylinder 11*a*.

The outside air discharged from the fluid passages 19 that open to the top face 110 of the plug cylinder 11*a* passes between the end of the plug guide 63 adjacent to the opening and the corner 11*f* of the plug cylinder 11*a* and is discharged to the outside air from the space between the lid 61 and the securing nut 21 screwed on the lid 61.

After the outside air is discharged, the lid 61 is removed from the securing nut 21. Since the lid 61 is integrally provided with the plug bush 63*b*, the end of the plug bush 63*b* is removed from the liquid passage 16 of the plug cylinder 11*a* by removing the lid 61.

As described above, by loosening the screwing of the lid 61, the pressure in the gas passages 17 and the pressure in the liner 3 are immediately equalized to atmospheric pressure. Furthermore, immediately before the lid 61 is removed, the pressure of the outside air between the outer container 4 and the liner 3 is immediately equalized to atmospheric pressure. Since the pressure in the liner 3 has already come to atmospheric pressure, the liquid can be prevented from being guided from the interior of the liner 3 through the liquid discharge tube 15 to the liquid passage 16 and being let out and splashing from the outer-container mouth 4*a*.

As described above, the joint 31 according to this embodiment offers the following operational advantages.

The lid (fitted member) 61 includes the cylindrical plug guide (sealing cylinder) 63 that slides on the outer wall of the plug cylinder 11*a* in the axial direction of the plug cylinder 11*a*, the O-ring (opening sealing means) 107 provided at the end of the plug guide 63 adjacent to the opening, and the plug bush (liquid-passage sealing means) 63*b* provided integrally with the lid 61 together with the plug guide 63. The outer-container mouth 4*a* of the container 2 is provided with the securing nut (connecting means) 21 that connects the plug 11 and the lid 61 to the outer-container mouth 4*a*, and the lid 61 can be moved relative to the securing nut 21 so as to be separated from the outer-container mouth 4*a*. This allows the plug guide 63 to be slid in the axial direction of the plug cylinder 11*a* by moving the lid 61 relative to the securing nut 21 so as to be separated from the outer-container mouth 4*a*. This therefore allows the seal of the liquid passage 16 to be released after the seal of the openings 11*b* of the plug cylinder 11*a* is released. Accordingly, this can prevent the gas and liquid from being let out together from the liner (flexible container) 3, thereby preventing the liquid from splashing when the liquid is let out from the liner 3.

What is claimed is:

1. A coupling device which is provided at the mouth of a container accommodating a flexible container containing liquid and gas and which includes a single-piece plug and a fitted member to be fitted in the single-piece plug, wherein the single-piece plug includes:
   a cylindrical plug cylinder;
   a liquid passage communicating with the liquid and through which the liquid is let in and out;
   a gas passage communicating with the gas and through which the gas is let in and out; and
   a fluid passage communicating with a space between the container and the flexible container and through which fluid is let in and out,
   wherein a plurality of the gas passages are provided on a circle centered on the axis of the plug cylinder in the axial direction,
   wherein a plurality of the fluid passages are provided on a second circle centered on the axis in the axial direction,
   wherein the gas and the fluid passages are provided at a predetermined angle with respect to each other,
   wherein each of the plurality of the fluid passages is located between two gas passages of the plurality of gas passages which are adjacent to each other, and
   wherein each of the plurality of the gas passages is located between two fluid passages of the plurality of fluid passages which are adjacent to each other.

2. The coupling device according to Claim 1, wherein
   the plug includes an opening communicating with the gas passages and opening in an outer wall of the plug cylinder;
   the fitted member includes fluid-passage unsealing means for releasing the seal of the fluid passages and liquid-passage sealing means for sealing the liquid passage; and
   the coupling device further includes a sliding member that slides on the outer wall of the plug cylinder in the axial direction to release the seal of the opening, and after the seal of the fluid passages is released by the fluid-passage unsealing means, releases the seal of the liquid passage.

3. The coupling device according to Claim 2, wherein
   the fitted member is a socket including a cylindrical socket cylinder that slides on the outer wall of the plug cylinder in the axial direction of the plug cylinder, opening sealing means provided at the socket cylinder and sealing the opening, the liquid-passage sealing means provided at the socket cylinder and sealing the liquid passage, and the fluid-passage unsealing means provided at the socket cylinder and releasing the seal of the fluid passages,
   wherein the mouth of the container includes connecting means for connecting the plug and the socket to the mouth of the container; and
   the socket is removed after the seal of the opening is released, and after the seal of the fluid passages is released by the fluid-passage unsealing means.

4. The coupling device according to Claim 3, wherein
   the connecting means is cylindrical in shape, and the socket cylinder is inserted at the inner wall side of the connecting means;
   the socket cylinder has a recessed portion recessed in a predetermined shape in the outer wall thereof; and
   the connecting means has a protruding portion, in the radial direction of the inner wall thereof, that can be fitted in the recessed portion.

5. The coupling device according to Claim 2, wherein
   the fitted member is a lid having a cylindrical sealing cylinder that slides on the outer wall of the plug cylinder in the axial direction of the plug cylinder, opening sealing means provided at the sealing cylinder and sealing the opening, and liquid-passage sealing means provided at the sealing cylinder and sealing the liquid passage;

the mouth of the container includes connecting means for connecting the plug and the lid to the mouth of the container; and the lid is movable relative to the connecting means so as to separate from the mouth of the container.

* * * * *